Jan. 15, 1935. M. C. GORDON ET AL 1,988,381
PEACH TURNING APPARATUS
Filed July 15, 1933   3 Sheets-Sheet 1

Inventors
Melvin C. Gordon &
Domenic Oliva

By Bryant Loran
Attorneys

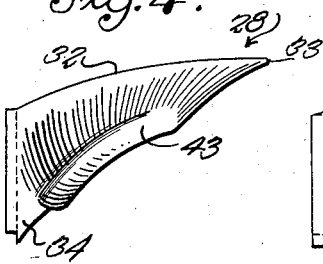
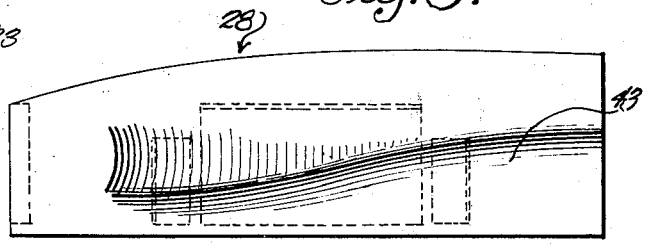
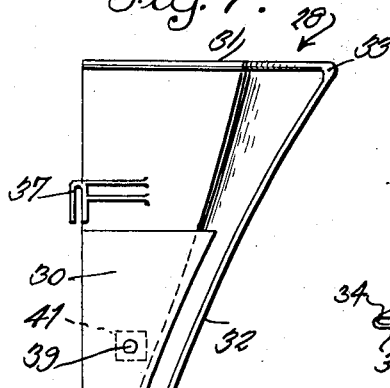
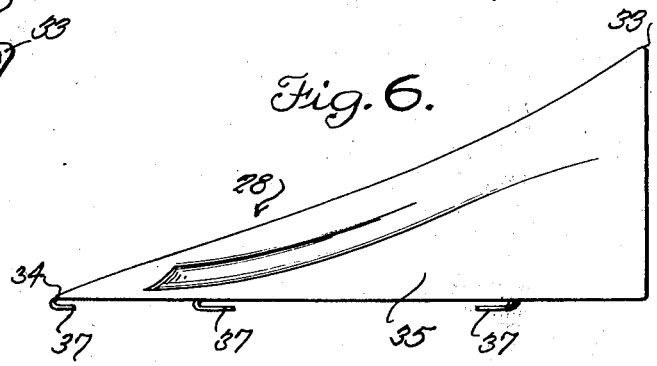
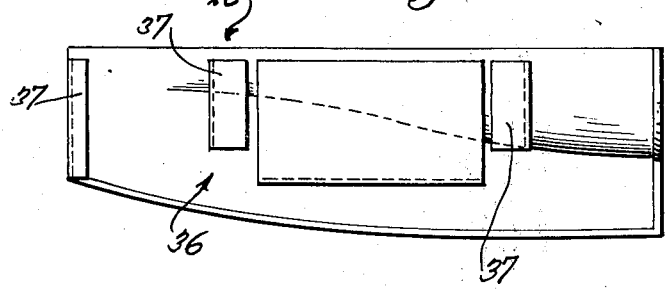
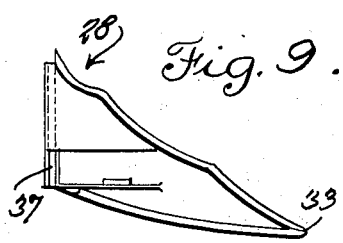

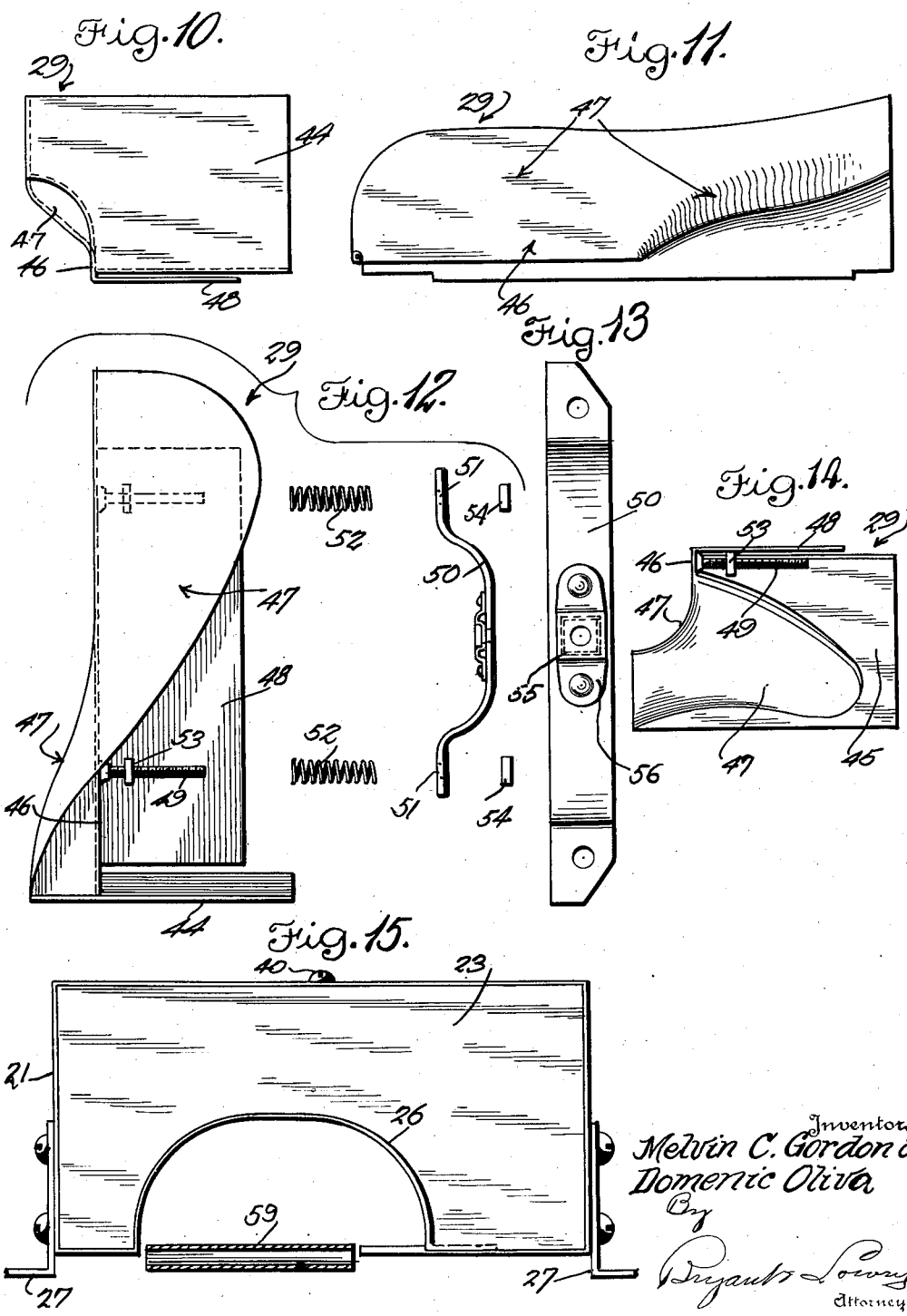

Patented Jan. 15, 1935

1,988,381

UNITED STATES PATENT OFFICE 1,988,381

PEACH TURNING APPARATUS

Melvin C. Gordon and Domenic Oliva, Lincoln, Calif.

Application July 15, 1933, Serial No. 680,607

3 Claims. (Cl. 198—33)

This invention relates to certain new and useful improvements in peach turning apparatus.

The primary object of this invention is to provide turning apparatus for peaches in which the peaches after being pared and halved are delivered to the apparatus and in passing therethrough are turned to present the pit side thereof downwardly when delivered to a slicing blade or machine.

It has been found in practice that when halved peaches are sliced with the cutting knife initially engaged with the pit side of the peach half, the resultant slices are uneven and ragged, the apparatus of this invention resulting in the turning of the peach halves to present the pit side thereof downwardly so that a cutting knife is engaged with the peach half at the curved outer side thereof to produce an even and smooth cut or slicing of a peach half into slices of the same thickness.

It is a further object of the invention to provide a peach turning apparatus of the foregoing character wherein tensioned guides within a box-like structure are provided with opposed multi-curved or cam faces having peach halves presented thereto by an endless conveyor to effect turning of the peach halves to present the pit sides thereof downwardly.

With the above and other objects in view that will become apparent as the nature of the invention is better understood, the same consists in the novel form, combination and arrangement of parts hereinafter more fully described, shown in the drawings and claimed.

In the drawings:—

Figure 4 is a front end elevational view of one of the tensioned peach turning guides;

Figure 5 is a side elevational view of the same guide showing the cam or curved faces for engagement with a peach half;

Figure 6 is a bottom plan view of said guide;

Figure 7 is a top plan view of said guide;

Figure 8 is an outer side elevational view of said guide, showing the vertical guide flanges carried thereby;

Figure 9 is a rear end elevational view of the same guide;

Figure 10 is a front end elevational view of the other guide;

Figure 11 is an inner side elevational view of the guide shown in Figure 10 disclosing the curved or cam peach engaging faces thereof;

Figure 12 shows in top plan the several elements forming said guide;

Figure 13 is a plan view of the adjusting or tensioning arms for the guide;

Figure 14 is a rear end elevational view of the guide shown in Figures 10 and 11; and Figure 15 is a rear end elevational view of the box-like casing enclosing the peach turning guides.

Figure 1:
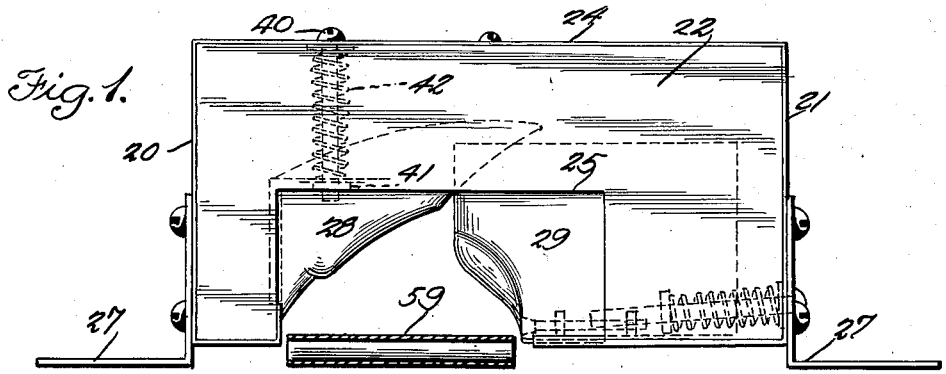
Figure 1 is a front end elevational view of the peach turning apparatus showing the tensioned peach turning guides and the conveyor for delivering peach halves thereto.

Referring more in detail to the accompanying drawings, and particularly to Figures 1 to 3 and 15, there is illustrated a peach turning apparatus in the form of a rectangular box-like casing, although the same may be constructed of other shapes if desired, the casing comprising side walls 20 and 21, end walls 22 and 23 and a top wall 24, the end wall 22 constituting the front end of the casing having a bottom edge opening 25 therein for introduction of peaches while the rear end wall 23 is provided with a bottom edge opening surrounded by a flange 26 constituting an outlet. The side walls 20 and 21 of the casing have angle brackets 27 attached thereto providing anchoring feet therefor.

A pair of peach turning guides 28 and 29 is resiliently mounted in the casing and has opposed curved or cam faces extending longitudinally of the casing and in line with the end wall openings 25 and 26, the guide 28 being vertically tensioned while the guide 29 is horizontally tensioned. The guide 28 is shown in detail in Figures 4 to 9 and the guide 29 is shown in detail in Figures 10 to 14. As shown in Figures 1, 2 and 4 to 9, the guide 28 is of substantially triangular formation as shown in top plan in Figure 7, having a flat top wall 30, a right angular end wall 31 and an acute angled side wall 32 extending from the point 33 of the end wall 31 to the apex 34 of the triangle. The guide 28 is of shell formation and further has a bottom wall 35 and an outer side portion 36 as shown in Figure 8, the side portion 36 carrying spaced vertical guide flanges 37 engageable with lugs, brackets or the like within the casing to facilitate vertical adjustment of the guide 28 to accommodate the apparatus for different sizes of peaches. The top wall 30 of the guide 28 has an opening 39 therein for the passage of a screw bolt 40 passing through the top wall 24 of the casing, a nut 41 being threaded upon the lower end of the bolt 40 while a coil spring 42 surrounds the bolt between the top wall 24 of the casing and the top wall 30 of the guide 28 for tensioning the guide 28 in a downward direction. The underside 43 of the guide 28 is fashioned as shown in Figures 4 and 5, being provided with curved or cam faces engageable with a peach half and cooperating with an opposed curved or cam face on the guide 29 for turning the peach halves in their travel through the casing.

Figure 2:
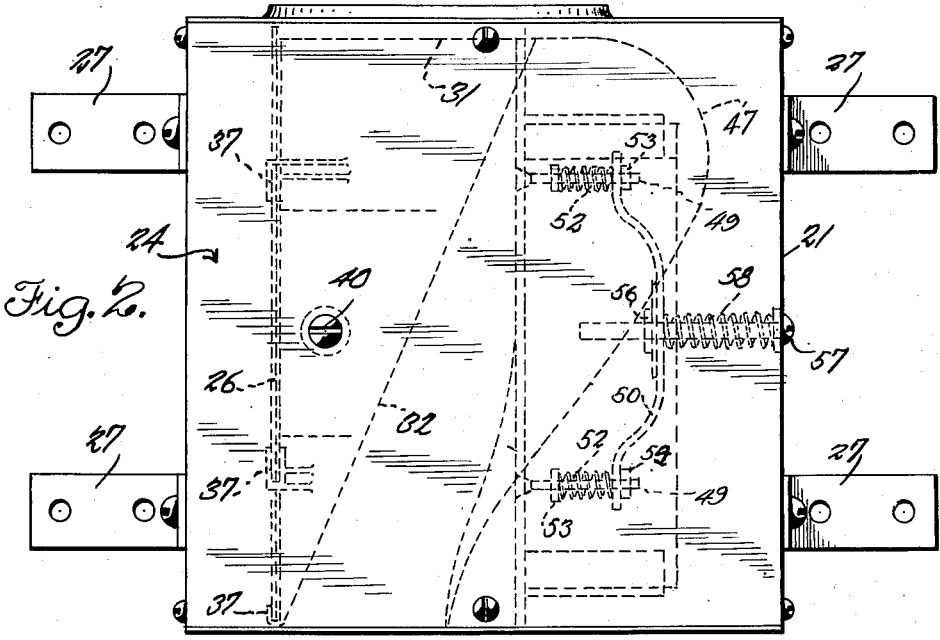
Figure 2 is a top plan view of the apparatus.
Figure 3:
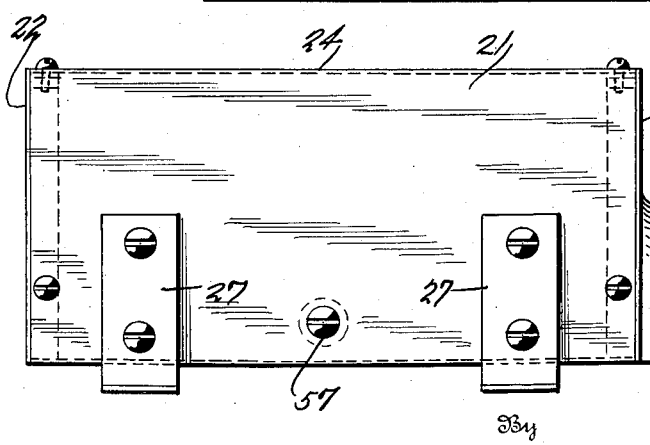
Figure 3 is a side elevational view.

The guide 29 as shown in Figures 1, 2 and 10 to 14 comprises end walls 44 and 45 connected by a side wall 46 having a curved or cam face 47 opposite the cam face 43 of the guide 28. The lower edge of the side wall 46 carries a flange plate 48 cooperating with guide members in the bottom of the casing, the guide 29 being tensioned in a horizontal direction toward the guide 28. A pair of screw bolts 49 projects laterally of the side wall 46 adjacent to and above the guide flange 48 and receives the saddle bar 50 by means of the apertured ends 51, coil springs 52 surrounding the screw bolts 49 between the nuts 53 adjustable on the screw bolts and the ends of the saddle bar 50, the nuts 54 being engaged with the screw bolts outwardly of the saddle bar as shown in Figure 2, these parts in detail being illustrated in Figures 12 and 13. The saddle bar 50 as shown in Figure 13 that constitutes a tensioning arm for the guide 29 carries a nut 55 centrally thereof that is retained in position by the strap 56 to receive the screw bolt 57 passed through the side wall 21 of the casing as shown in Figure 2, the screw bolt 57 being surrounded by a coil spring 58 between the side wall 21 and saddle bar 50. The openings 25 and 26 in the end walls of the casing have the opposed curved faces of the guides 28 and 29 in line therewith, the casing being open at its underside in line with said openings 25 and 26 to accommodate the passage of an endless conveyor 59.

In the operation of the device, the right side of a peach half entering the machine with the pit side up, first touches or moves into contact with the guide 29 and the peach is tilted upwardly to contact the guide 28, the peach moving on the belt 59. The increasing angle of the curved faces of the guides 28 and 29 co-act with the peach half to accomplish the turning of the same to present the pit side downwardly on the endless belt 59. When a peach half enters the machine on the endless belt with the pit side downwardly, the same is moved through the machine out of contact with the guides 28 and 29 and is delivered to the slicing machine in the proper position.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

We claim:—

1. Means for turning halved peaches to present the pit sides downwardly when delivered to a slicer comprising a casing, an endless conveyor below the casing, a pair of spring pressed guides in the casing having opposed curved faces for engaging the peach halves during their travel through the casing on the endless conveyor, each peach turning guide having a slide-guide connection with the casing and adjustably tensioned screw connections between the casing and guides.

2. Means for turning halved peaches to present the pit sides downwardly when delivered to a slicer comprising a casing, an endless conveyor below the casing, a pair of spring pressed guides in the casing having opposed curved faces for engaging the peach halves during their travel through the casing on the endless conveyor, and said guides being mounted for relative movements in directions at right angles to each other, each peach turning guide having a slide-guide connection with the casing and adjustably tensioned screw connections between the casing and guides.

3. Means for turning halved peaches to present the pit sides downwardly when delivered to a slicer comprising a casing, an endless conveyor below the casing, a pair of spring pressed guides in the casing having opposed curved faces for engaging the peach halves during their travel through the casing on the endless conveyor, one of said guides being vertically shiftable and the other guide being horizontally shiftable, each peach turning guide having a slide-guide connection with the casing and adjustably tensioned screw connections between the casing and guides.

MELVIN C. GORDON.
DOMENIC OLIVA.